United States Patent
Lin et al.

(10) Patent No.: US 11,403,728 B2
(45) Date of Patent: Aug. 2, 2022

(54) AUTOMATIC ADJUSTING METHOD FOR EQUIPMENT AND SMART ADJUSTING DEVICE USING THE SAME

(71) Applicant: UNITED MICROELECTRONICS CORP., Hsinchu (TW)

(72) Inventors: Yu-Chi Lin, Taichung (TW); Li-Hsin Yang, Tainan (TW); Ching-Pei Lin, Hsinchu County (TW); Ming-Wei Chen, Tainan (TW); Wei-Hong Zhu, Hsinchu County (TW)

(73) Assignee: UNITED MICROELECTRONICS CORP., Hsinchu (TW)

( * ) Notice: Subject to any disclaimer, the term of this patent is extended or adjusted under 35 U.S.C. 154(b) by 298 days.

(21) Appl. No.: 16/906,263

(22) Filed: Jun. 19, 2020

(65) Prior Publication Data

US 2021/0358071 A1 Nov. 18, 2021

(30) Foreign Application Priority Data

May 18, 2020 (CN) .......................... 202010418228.8

(51) Int. Cl.
*G06T 1/00* (2006.01)
*G06T 7/20* (2017.01)
*G06T 7/00* (2017.01)

(52) U.S. Cl.
CPC .......... *G06T 1/0014* (2013.01); *G06T 7/0004* (2013.01); *G06T 7/20* (2013.01); *G06T 2200/24* (2013.01); *G06T 2207/10061* (2013.01); *G06T 2207/30148* (2013.01)

(58) Field of Classification Search
CPC ....... G06T 1/0014; G06T 7/0004; G06T 7/20; G06T 2200/24; G06T 2207/10061; G06T 2207/30148; G09G 2320/0247; G09G 2354/00; G09G 2380/00; G09G 3/006; G06V 30/14; G05B 19/0426; G05B 19/04
See application file for complete search history.

(56) References Cited

U.S. PATENT DOCUMENTS

| | | | |
|---|---|---|---|
| 8,265,357 B2 * | 9/2012 | Ramsing | G06T 7/254 |
| | | | 382/128 |
| 8,356,260 B2 | 1/2013 | Nagatomo et al. | |
| 8,645,818 B2 * | 2/2014 | Kuwata | G06F 3/1208 |
| | | | 715/243 |

FOREIGN PATENT DOCUMENTS

| | | | | | |
|---|---|---|---|---|---|
| JP | 2007122995 A | * | 5/2007 | | H01J 37/28 |
| JP | 2020014562 A | * | 1/2020 | | A61B 6/486 |

* cited by examiner

*Primary Examiner* — Carol Wang
(74) *Attorney, Agent, or Firm* — WPAT, PC

(57) ABSTRACT

An automatic adjusting method for equipment and a smart adjusting device using the same are provided. The automatic adjusting method of the equipment includes the following steps. A template frame from the equipment is obtained in an initial period. Several clear frames are obtained in one window period. Each of the template frame and the clear frame has a pixel variation. The pixel variation of the template frame is the largest in the initial period. The pixel variation of each of the clear frame is greater than a threshold. Each of the clear frame is compared with the template frame to obtain an offset. A statistical value of the offsets is calculated. A parameter of the equipment is adjusted to reduce the statistical value.

20 Claims, 6 Drawing Sheets

US 11,403,728 B2

AUTOMATIC ADJUSTING METHOD FOR EQUIPMENT AND SMART ADJUSTING DEVICE USING THE SAME

This application claims the benefit of People's Republic of China application Serial No. 202010418228.8, filed May 18, 2020, the subject matter of which is incorporated herein by reference.

BACKGROUND OF THE INVENTION

Field of the Invention

The invention relates in general to an automatic controlling method and an electric device using the same, and more particularly to an automatic adjusting method for equipment and a smart adjusting device using the same.

Description of the Related Art

With the development of semiconductor technology, the operation of measuring equipment and process equipment is becoming more and more complex. During the operation of the measuring equipment and the process equipment, the operator must be quite familiar with the user interface process. According to the information displayed on the screen, the operator performs the corresponding operations. Each measuring equipment and process equipment needs an operator to monitor at any time, so it must consume a lot of manpower to operate the measuring equipment and process equipment. Especially in scanning electron microscopes and lithography equipment, the screen may flicker and shake. It is more necessary to manually identify the screen stability to confirm whether the equipment parameter is calibrated.

Researchers are working hard to develop the technology of using software robots, such as Robotic Process Automation (RPA), to operate measuring equipment and process equipment. However, software robots' ability to recognize the stability of the frame is quite inadequate, and there is a considerable degree of difficulty, which has been formed a technical bottleneck for a long time.

SUMMARY OF THE INVENTION

The invention is directed to an automatic adjusting method for equipment and a smart adjusting device using the same. By analyzing the pixel variations, the software robots, such as Robotic Process Automation (RPA), can recognize the stability of the frame and then adjust the parameter of the equipment automatically.

According to a first aspect of the present invention, an automatic adjusting method for equipment is provided. The automatic adjusting method includes the following steps. A template frame is obtained from the equipment in an initial period. In a window period, a plurality of clear frames each of which has a pixel variation are obtained. The pixel variation of the template frame is the largest in the initial period. The pixel variation of each of the clear frames is greater than a threshold. Each of the clear frames is compared with the template frame to obtain an offset. A statistical value of the offsets is calculated. A parameter of the equipment is adjusted to reduce the statistical value.

A smart adjusting device, for automatically adjusting equipment. The smart adjusting device includes a communication unit, a frame analyzing unit and a remote controlling unit. The communication unit is configured to connect to the equipment remotely. The frame analyzing unit includes a template frame analyzer, a clarity analyzer, an offset calculator and a statistical analyzer. The template frame analyzer is configured to obtain a template frame from the equipment in an initial period. The clarity analyzer is configured to obtain, in a window period, a plurality of clear frames each of which has a pixel variation. The pixel variation of the template frame is the largest in the initial period. The pixel variation of each of the clear frames is greater than a threshold. The offset calculator is configured to compare each of the clear frames with the template frame to obtain an offset. The statistical analyzer is configured to calculate a statistical value of the offsets. The remote controlling unit includes an adjuster. The adjuster is configured to adjust a parameter of the equipment to reduce the statistical value.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
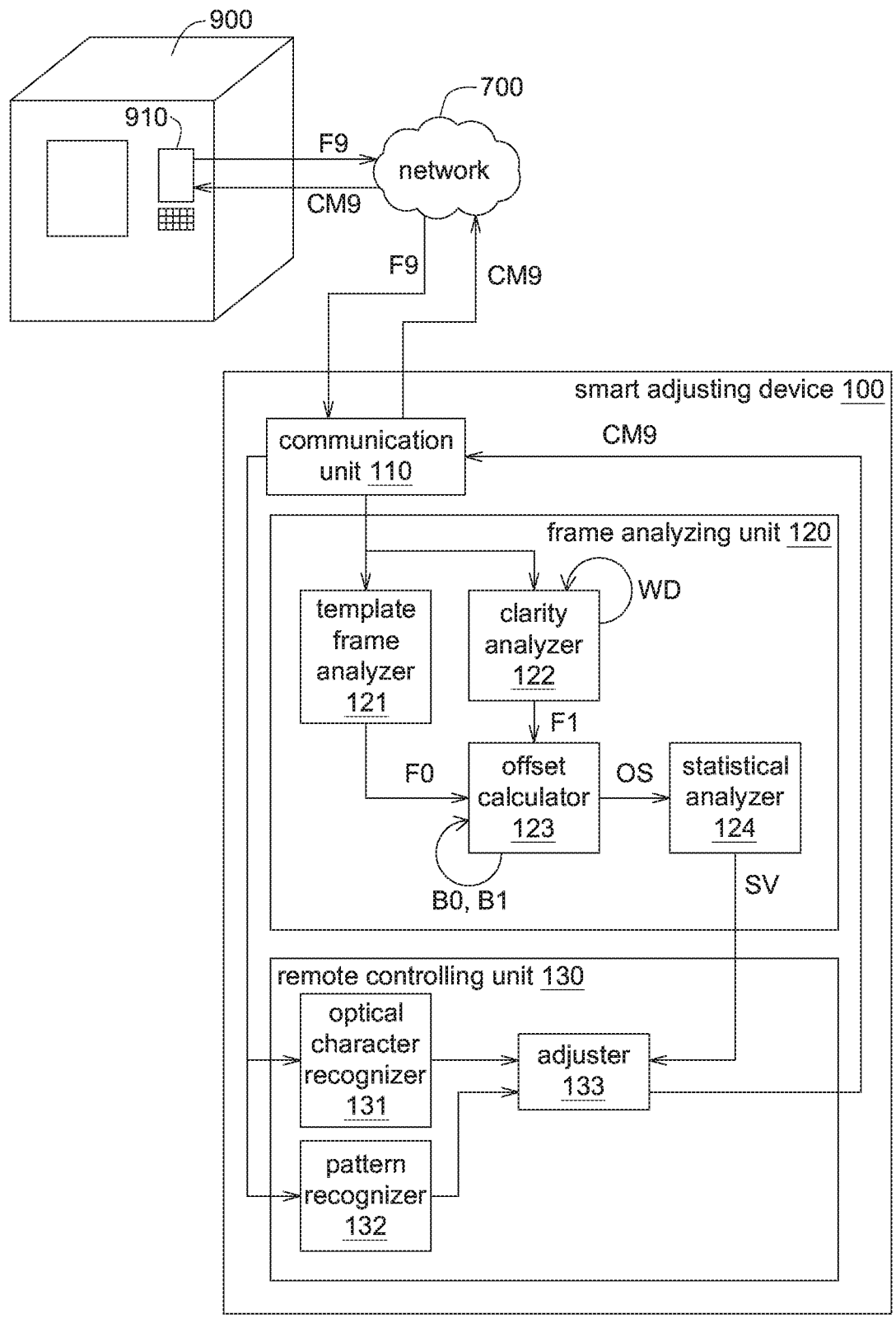
FIG. 1 shows a smart adjusting device according to one embodiment.

Please refer to FIG. 1, which shows a smart adjusting device 100 according to one embodiment. For example, a smart adjusting device 100 is a server, a cluster computing system, or a computer. The smart adjusting device 100 is configured to control the equipment 900. The equipment 900 may be a process equipment or a measuring equipment, such as a Critical Dimension Scanning Electron Microscope (CD-SEM). The equipment 900 has a user interface 910. The user interface 910 may be a touch screen. The operator may click the command block on the operation frame F9 shown on the user interface 910, to give an adjusting command CM9 to the equipment 900. In the present embodiment, the smart adjusting device 100 can analyze the operation frame F9 remotely, and give the adjusting command CM9 according to the analysis result, without the need for the operator to stand in front of the equipment 900.

Please referring to FIG. 1, a smart adjusting device 100 includes a communication unit 110, a frame analyzing unit 120 and a remote controlling unit 130. The communication unit 110 is configured to remotely connect to the equipment 900 via network 700. The communication unit 110 may be a wireless communication module or a wired network module. The frame analyzing unit 120 includes a template frame analyzer 121, a clarity analyzer 122, an offset calculator 123 and a statistical analyzer 124. The frame analyzing unit 120 is configured to analyze the frames for obtaining a statistical value SV which represents frame stability. The remote controlling unit 130 includes an optical character recognizer 131, a pattern recognizer 132 and an adjuster 133. The remote controlling unit 130 is configured to adjust the equipment 900 for increasing the frame stability. The frame analyzing unit 120 and the remote controlling unit 130 may be a circuit, a chip, a circuit board or a storage device storing program codes. The operation of the smart adjusting device 100 is illustrated via a flowchart.

Figure 2:
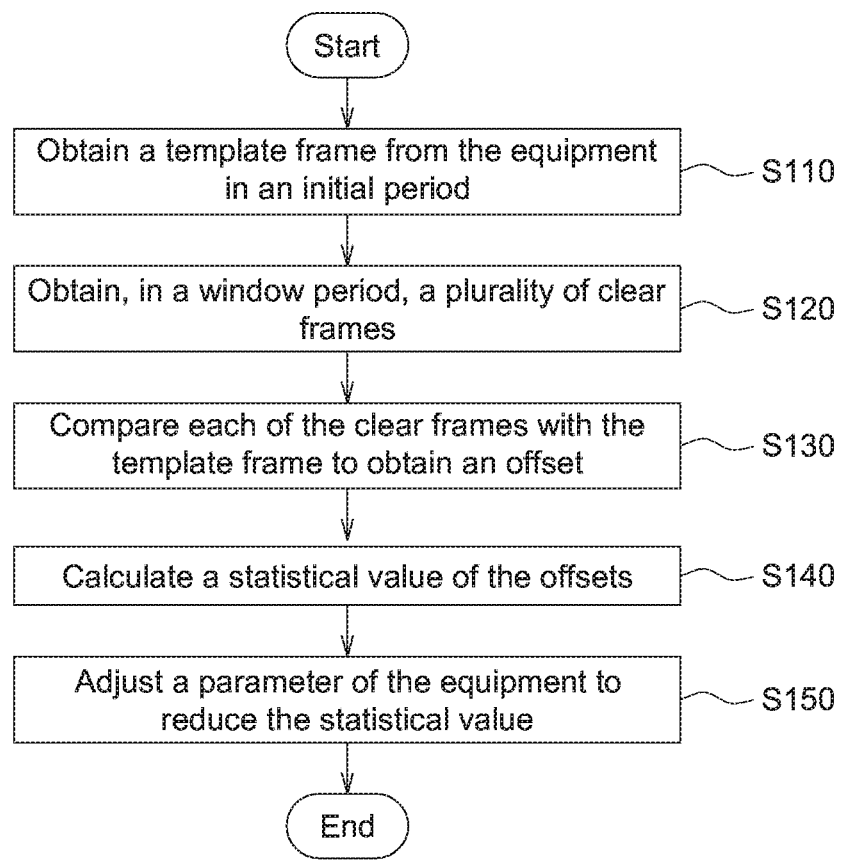
FIG. 2 shows a flowchart of the automatic adjusting method for the equipment according to one embodiment.
Figure 3:
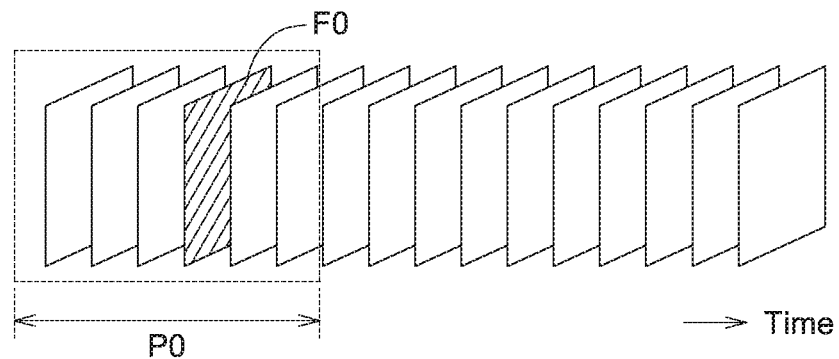
FIG. 3 illustrates the step S110 according to one embodiment.
Figure 4:
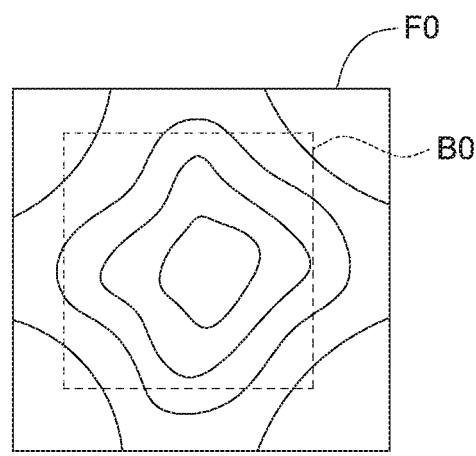
FIG. 4 shows a template frame according to one embodiment.

Please refer to FIG. 2, which shows a flowchart of the automatic adjusting method for the equipment 900 according to one embodiment. Firstly, please refer to FIGS. 3 and 4. FIG. 3 illustrates the step S110 according to one embodiment. FIG. 4 shows a template frame F0 according to one embodiment. In step S110, the template frame analyzer 121 obtains the template frame F0 from the equipment 900 in an initial period P0. In one embodiment, the initial period P0 is a first second period. In the initial period P0, 25 or 60 frames from the beginning are obtained. Each of the frames may be a full frame of the operation frame F9 on the user interface 910, or one window in the operation frame F9 on the user interface 910. This window may show a calibration pattern. In the initial period P0, each frame has a pixel variation. The pixel variation of the template frame F0 is the largest in the initial period P0. Generally speaking, the more obvious the difference in pixel depth, the more clear lines can be presented. Thus, in the present disclosure, the frame having the largest pixel variation is defined as the template frame F0. The template frame F0 can be used to determine whether the subsequent frames are shaking.

Figure 5:
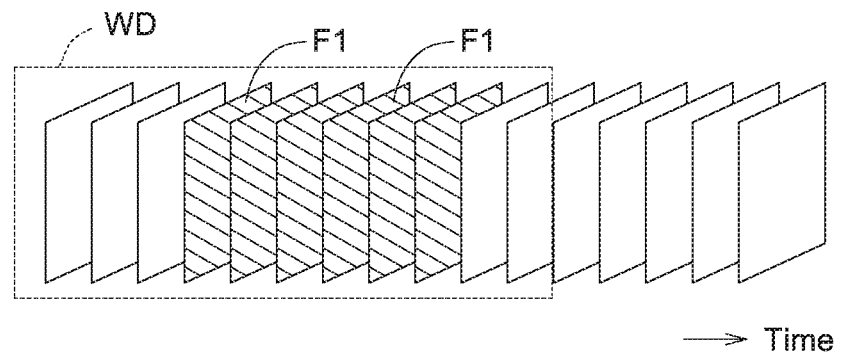
FIG. 5 illustrates the step S120 according to one embodiment.

Next, please refer to FIG. 5, which illustrates the step S120 according to one embodiment. Due to the flashing of the frames, it is impossible to take all the frames into consideration. In step S120, the clarity analyzer 122 obtains a plurality of clear frames F1 in one window period WD. The window period WD may be a 5 seconds period, a 10 seconds period, or a 20 seconds period. The window period WD is not necessarily the beginning period, and may be any middle period. The frames in the window period WD has a pixel variation. The frames whose pixel variation is larger than a threshold TH is defined as the clear frames F1. The threshold TH may be a top ⅔ value, a top ½ value, a top ⅓ value of the pixel variations in the window period WD, or a predetermined value. When the frame is continuously extracted over time, the window period WD is moved to update the threshold TH and update the clear frames F1. For example, every time a new frame is added, the window period WD is moved by one frame to include the new frame and remove one frame.

Figure 6:
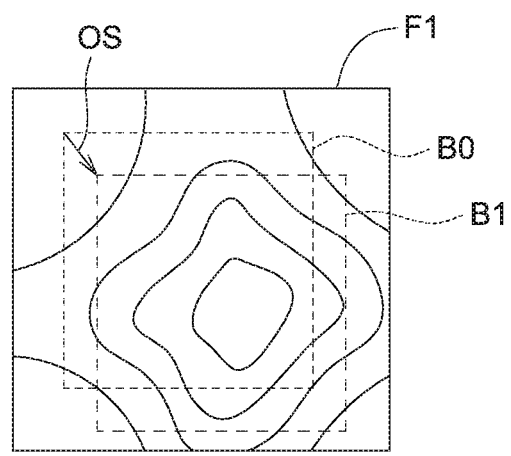
FIG. 6 illustrates the step S130 according to one embodiment.

Then, please refer to FIG. 6, which illustrates the step S130 according to one embodiment. In the step S130, the offset calculator 123 compares each of the clear frames F1 with the template frame F0 to obtain an offset OS. In this step, the offset calculator 123 defines a comparison border B1 of each of the clear frames F1, and a comparison border B0 of the template frame F0. The comparison border B1 and the comparison border B0 are similar. The displacement between the comparison border B1 and the comparison border B0 is the offset OS. Generally speaking, if the frame stability is not high, it will make the offset OS vary greatly.

Next, in the step S140, the statistical analyzer 124 calculates a statistical value SV of the offsets OS. The statistical value SV may be an average or a maximum. The statistical value SV represents the frame stability of the equipment 900 under the parameter setting.

Figure 7:
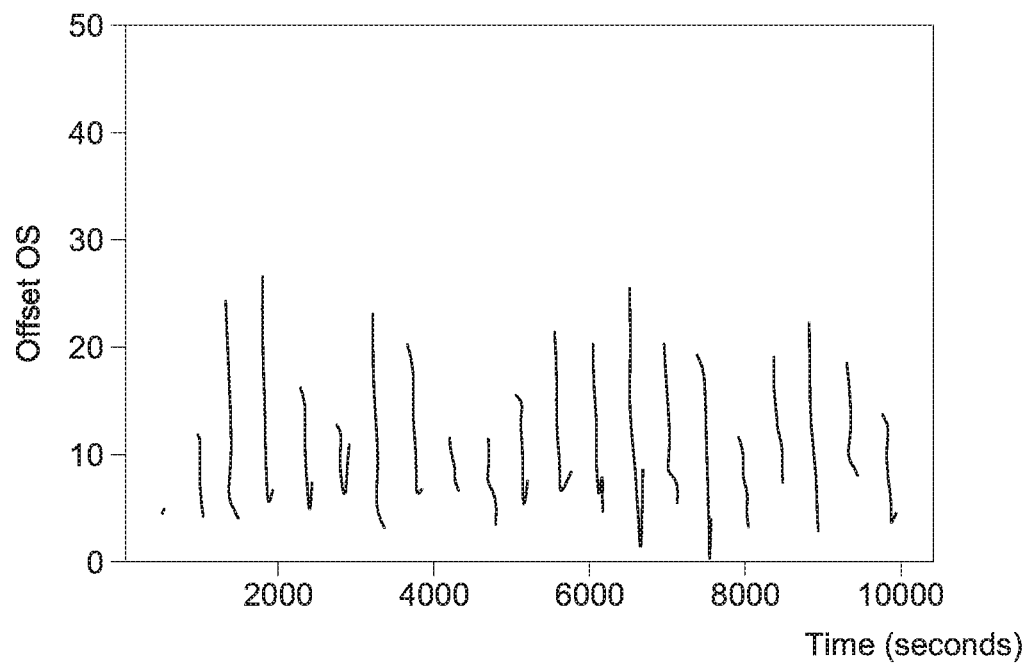
FIG. 7 shows a distribution curve of the offsets when the parameter is not adjusted correctly.

Afterwards, in the step S150, the adjuster 133 of the remote controlling unit 130 outputs the adjusting command CM9 to adjust the parameter of the equipment 900 for reducing the statistical value SV. Please refer to FIG. 7, which shows a distribution curve of the offsets OS when the parameter is not adjusted correctly. As shown in FIG. 7, when the parameter is not adjusted correctly, the offsets OS vary more greatly.

Figure 8:
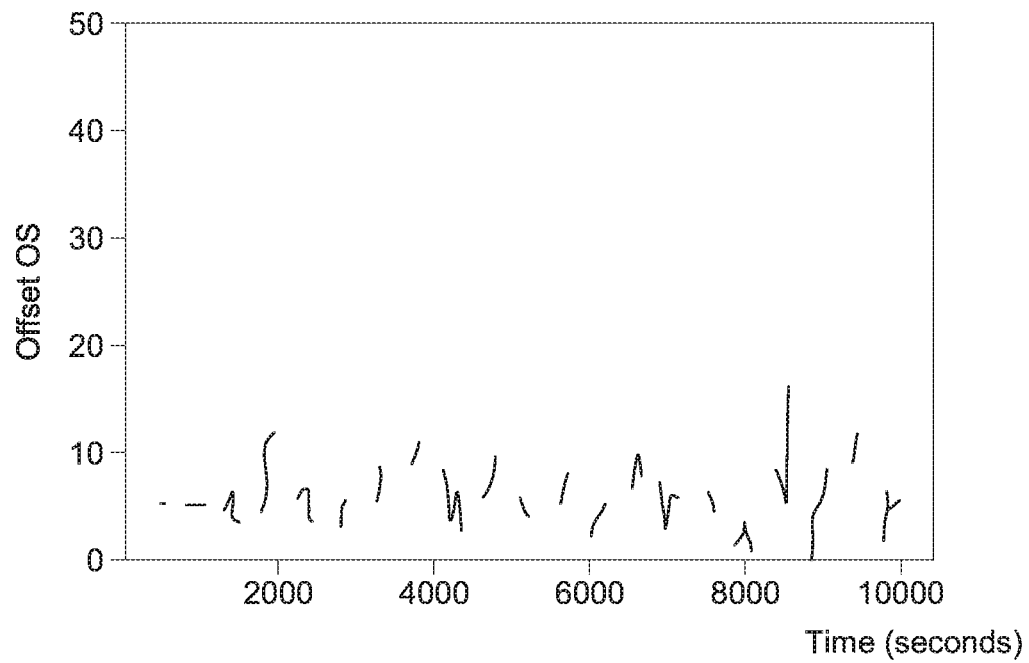
FIG. 8 shows a distribution curve of the offsets when the parameter is adjusted correctly.

Please refer to FIG. 8, which shows a distribution curve of the offsets OS when the parameter is adjusted correctly. As shown in FIG. 8, after the parameter of the equipment 900 is adjusted, the offsets OS vary more significantly. That is to say, the parameter setting in FIG. 8 is better than the parameter setting in FIG. 7.

Figure 9:
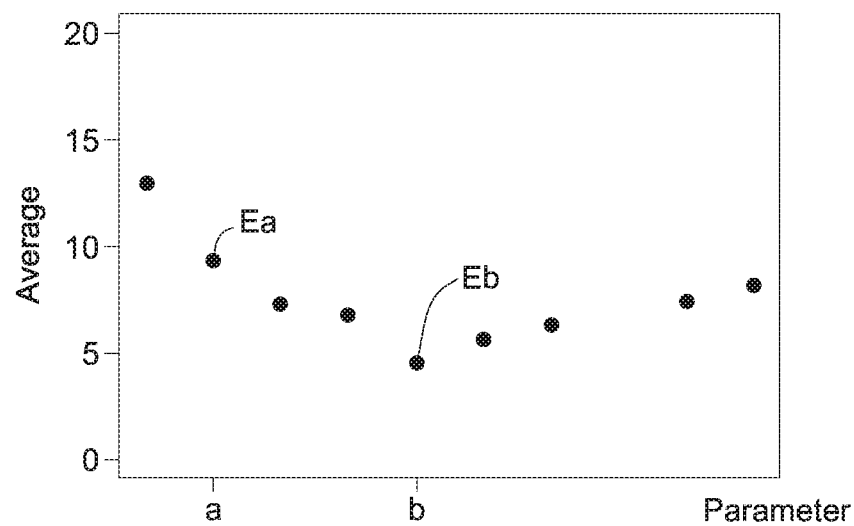
FIG. 9 shows a distribution curve of the average values changed with the parameter settings.
Figure 10:
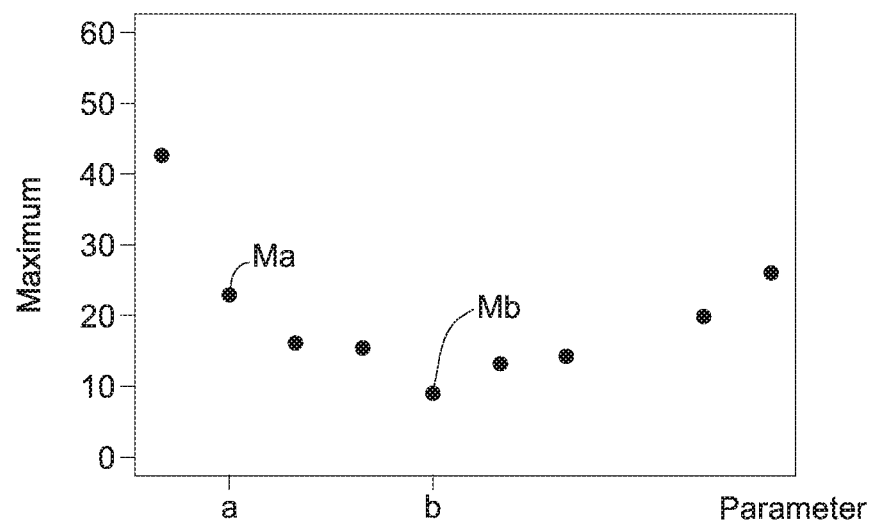
FIG. 10 shows a distribution curve of the maximums changed with the parameter settings.

Please refer to FIG. 9, which shows a distribution curve of the average values changed with the parameter settings. Comparing with the parameters set as the scale a and the scale b, the average value Eb is lower than the average Ea. Please refer to FIG. 10, which a distribution curve of the maximums changed with the parameter settings. Comparing with the parameters set as the scale a and the scale b, the maximum Mb is lower than the maximum Ma. As can be seen from the FIGS. 9 and 10, the best parameter setting is the lowest point among the averages (or the maximums). Therefore, when the adjuster 133 increases the parameter, whether the averages (or the maximums) are decreased is determined. If the averages (or the maximums) are decreased, then the adjuster 133 keeps increasing the parameter; if the averages (or the maximums) are not decreased, then the adjuster 133 decreases the parameter. Similarly, when the adjuster 133 decreases the parameter, whether the averages (or the maximums) are decreased is determined. If the averages (or the maximums) are decreased, then the adjuster 133 keeps decreasing the parameter; if the averages (or the maximums) are not decreased, then the adjuster 133 increases the parameter. The above actions are repeated until the lowest point of the average (or maximum) distribution curve is reached.

When performing the step S150, the adjuster 133 is assisted by the optical character recognizer 131 and the pattern recognizer 132. The optical character recognizer 131 recognizes the characters on the user interface 910 of the equipment 900. The pattern recognizer 132 recognizes buttons on the user interface 910 of the equipment 900. After recognizing the characters and the buttons on the user interface 910, the adjuster 133 outputs the adjusting command CM9 to automatically click the button on the user interface 910, such that the parameter of the equipment 900 can be automatically adjusted.

According to the embodiments described above, the software robots, such as Robotic Process Automation (RPA), can recognize the stability of the frame and then adjust the parameter of the equipment 900 automatically.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An automatic adjusting method for equipment, comprising:
    obtaining a template frame from the equipment in an initial period;
    obtaining, in a window period, a plurality of clear frames each of which has a pixel variation, wherein a pixel variation of the template frame is largest in the initial period, and the pixel variation of each of the clear frames is greater than a threshold;
    comparing each of the clear frames with the template frame to obtain offsets;
    calculating a statistical value of the offsets; and
    adjusting a parameter of the equipment to reduce the statistical value.

2. The automatic adjusting method for equipment according to claim 1, wherein the initial period is a first second period.

3. The automatic adjusting method for equipment according to claim 1, wherein in the step of obtaining the plurality of clear frames, the window period is moved to update the clear frames.

4. The automatic adjusting method for equipment according to claim 3, wherein the window period is moved by one frame.

5. The automatic adjusting method for equipment according to claim 3, wherein after the window period is moved, the threshold is updated.

6. The automatic adjusting method for equipment according to claim 1, wherein the threshold is a top ⅔ value, a top ½ value or a top ⅓ value of the pixel variations in the window period.

7. The automatic adjusting method for equipment according to claim 1, wherein the statistical value is an average or a maximum of the offsets of the clear frames.

8. The automatic adjusting method for equipment according to claim 1, wherein in the step of adjusting the parameter of the equipment, the parameter is increased or decreased, such that the statistical value is reduced to a lowest point of a statistical value distribution curve.

9. The automatic adjusting method for equipment according to claim 1, wherein the equipment is a Critical Dimension Scanning Electron Microscope (CD-SEM).

10. A smart adjusting device, for automatically adjusting equipment, wherein the smart adjusting device comprises:
    a communication unit, configured to connect to the equipment remotely;
    a frame analyzing unit, including:
        a template frame analyzer, configured to obtain a template frame from the equipment in an initial period;
        a clarity analyzer, configured to obtain, in a window period, a plurality of clear frames each of which has a pixel variation, wherein a pixel variation of the template frame is largest in the initial period, and the pixel variation of each of the clear frames is greater than a threshold;
        an offset calculator, configured to compare each of the clear frames with the template frame to obtain offsets; and
        a statistical analyzer, configured to calculate a statistical value of the offsets; and
    a remote controlling unit, including:
        an adjuster, configured to adjust a parameter of the equipment to reduce the statistical value.

11. The smart adjusting device according to claim 10, wherein the initial period is a first second period.

12. The smart adjusting device according to claim 10, wherein the clarity analyzer is further configured to move the window period to update the clear frames.

13. The smart adjusting device according to claim 12, wherein the window period is moved by one frame.

14. The smart adjusting device according to claim 12, wherein after the window period is moved, the threshold is updated.

15. The smart adjusting device according to claim 10, wherein the threshold is a top ⅔ value, a top ½ value or a top ⅓ value of the pixel variations in the window period.

16. The smart adjusting device according to claim 10, wherein the equipment is a Critical Dimension Scanning Electron Microscope (CD-SEM).

17. The smart adjusting device according to claim 10, wherein the remote controlling unit further includes:
    an optical character recognizer (OCR), configured to recognize characters on a user interface of the equipment.

18. The smart adjusting device according to claim 10, wherein the remote controlling unit further includes:
    a pattern recognizer, configured to recognize buttons on a user interface of the equipment.

19. The smart adjusting device according to claim 10, wherein the statistical value is an average or a maximum of the offsets of the clear frames.

20. The smart adjusting device according to claim 10, wherein the adjuster increases or reduces the parameter, such that the statistical value is reduced to a lowest point of a statistical value distribution curve.

* * * * *